US008252369B2

(12) United States Patent
Jiang

(10) Patent No.: US 8,252,369 B2
(45) Date of Patent: Aug. 28, 2012

(54) PROCESS FOR APPLYING A COATING ONTO A FRESNEL LENS FORMING SURFACE

(75) Inventor: Peiqi Jiang, Tarpon Springs, FL (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 877 days.

(21) Appl. No.: 12/124,466

(22) Filed: May 21, 2008

(65) Prior Publication Data

US 2009/0291206 A1    Nov. 26, 2009

(51) Int. Cl.
*B05D 5/06* (2006.01)
*B05D 3/02* (2006.01)

(52) U.S. Cl. ............... 427/162; 427/164; 427/372.2

(58) Field of Classification Search .......... 427/256, 427/162, 164; 351/41
See application file for complete search history.

(56) References Cited

U.S. PATENT DOCUMENTS

| 4,070,105 | A | * | 1/1978 | Marzouk ............... 351/159 |
| 4,300,818 | A | * | 11/1981 | Schachar ............... 351/210 |
| 4,632,844 | A | * | 12/1986 | Yanagihara et al. ........ 427/488 |
| 5,147,585 | A | | 9/1992 | Blum et al. ............... 234/1.4 |
| 6,562,466 | B2 | | 5/2003 | Jiang et al. ............... 428/412 |
| 2005/0140033 | A1 | | 6/2005 | Jiang et al. ............... 264/1.32 |
| 2005/0269721 | A1 | | 12/2005 | Adileh et al. ............... 264/1.7 |
| 2006/0213611 | A1 | * | 9/2006 | Jiang ............... 156/295 |
| 2006/0219347 | A1 | | 10/2006 | Begon et al. ............... 156/230 |
| 2007/0270062 | A1 | | 11/2007 | Weber ............... 156/272.2 |
| 2008/0023138 | A1 | | 1/2008 | Zheng ............... 428/412 |

FOREIGN PATENT DOCUMENTS

| EP | 1830205 | 9/2007 |
| JP | 8090665 | 4/1996 |
| JP | 2007-212547 | 8/2007 |
| WO | WO 9733742 | 9/1997 |
| WO | WO 2007/141440 | 12/2007 |

OTHER PUBLICATIONS

PCT International Search Report and Written Opinion, issued in International Application No. PCT/EP2009/056133, mailed Aug. 26, 2009.

* cited by examiner

*Primary Examiner* — Dah-Wei Yuan
*Assistant Examiner* — Nga Leung Vera Law
(74) *Attorney, Agent, or Firm* — Fulbright & Jaworski L.L.P.

(57) ABSTRACT

Disclosed is a process for coating at least one geometrically defined surface of an optical article's substrate. The process can include: (a) providing a removable carrier made of plastic material and having an internal surface and external surface; (b) providing an optical article comprising a substrate having at least one geometrically defined surface forming a Fresnel lens; (c) depositing a curable coating composition onto either the at least one surface forming a Fresnel lens; (d) moving the carrier and optical article relatively to each other; (e) applying a pressure onto the external surface of the carrier to spread out the curable coating composition to cover said at least one surface forming a Fresnel lens; (f) curing the layer of curable coating composition; (g) withdrawing the removable carrier to recover the substrate of the optical article having at least one Fresnel lens forming surface coated with the cured coating composition.

23 Claims, 2 Drawing Sheets

PROCESS FOR APPLYING A COATING ONTO A FRESNEL LENS FORMING SURFACE

BACKGROUND OF THE INVENTION

1. Field of the Invention

The present invention relates to a process for manufacturing an optical article free of optical defects, in particular an ophthalmic lens, and more precisely for coating a geometrically defined surface forming a Fresnel lens lying on the substrate of said optical article.

The present invention also relates to a process for transferring a stack of coatings onto a geometrically defined surface forming a Fresnel lens lying on the substrate of an optical article.

2. Description of Related Art

It is a common practice in the art to coat at least one main surface of a lens substrate, such as an ophthalmic lens or lens blank, with several coatings for imparting to the finished lens additional or improved optical or mechanical properties. These coatings are in general designated as functional coatings.

Thus, it is usual practice to coat at least one main surface of a lens substrate, typically made of an organic glass material, with successively, starting from the surface of the lens substrate, an impact-resistant coating (impact resistant primer), an abrasion- and/or scratch-resistant coating (hard coat), an anti-reflection coating and, optionally, an anti-fouling top coat. Other coatings, such as a polarized, photochromic or dyeing coating may also be applied onto one or both surfaces of the lens substrate.

Numerous processes and methods have been proposed for coating smooth or not very rough surfaces using coating liquids or liquid adhesive compositions for transfer coating.

U.S. Pat. No. 6,562,466 describes a process for transferring coatings from at least one support or mold part onto at least a geometrically defined surface of a lens blank having a surface roughness $S_q$ lower than or equal to 1 μm, comprising:

providing a support or mold part having an internal surface bearing a coating and an external surface;

depositing onto said geometrically defined surface of the lens blank or onto said coating a pre-measured amount of a curable adhesive composition;

moving relatively to each other the lens blank and the support to either bring the coating into contact with curable adhesive composition or bring the curable adhesive composition into contact with the geometrically defined surface of the lens blank;

applying a sufficient pressure onto the external surface of the support so that the thickness of a final adhesive layer once the curable composition cured is less than 100 micrometers;

curing the layer of adhesive composition; and withdrawing the support or mold part to recover the lens blank with the coating adhered onto the geometrically defined surface of said lens blank.

US 2005/140033 describes a process for coating the fined but unpolished geometrically defined main face of an optical article, having a surface roughness $R_q$ lower than or equal to 1.5 μm, comprising:

depositing on the main face of the optical article or on the internal surface of the mold part an amount of a liquid curable coating composition;

moving relatively to each other the optical article and the mold part to either bring the coating composition into contact with the main face of the optical article or into contact with the internal face of the mold part;

applying pressure to the mold part to spread the liquid curable coating composition on said main face and form a uniform liquid coating composition layer onto the main face;

curing the liquid coating composition layer; and withdrawing the mold part to recover a coated optical article free of visible fining lines.

U.S. Pat. No. 5,147,585, WO 97/33742 and JP 8090665 disclose an overmolding process to make composite lenses such as progressive or bi-focal lenses. All the surfaces to be coated or overmolded are smooth curved surfaces.

Resin cure shrinkage is a phenomenon that inevitably occurs upon polymerization and curing of a curable composition. This phenomenon is due to density change and affects the coating resin in a three-dimensional way. The extent of the shrinkage depends on the nature of the coating resin material. For example, CR-39®'s shrinkage rate is about 12% in volume and other methacrylate monomers undergo a shrinkage rate of 7 to 14% depending on the formulations and chemical structures.

When the surface to be coated is smooth or little rough (surface roughness typically <2.0 μm), this shrinkage phenomenon is not a big concern. However, when the surface to be coated has a roughness level higher than 2 microns, e.g. surfaces forming a Fresnel lens that typically have roughness levels ranging from 5 to 300 μm, coating shrinkage is an important issue. The higher the size of the Fresnel structure is, the bigger the shrinkage issue will be. Especially concerned are Fresnel structures having a surface roughness level of at least 50 μm.

Although not wishing to be bound by any theory, it is believed that moving the carrier and the optical article which has the Fresnel structure on its surface relatively to each other and then applying pressure creates many small liquid cells filled with liquid curable composition. Upon polymerization and curing, the liquid cells shrink. When some cells are fully blocked or sealed by the carrier due to the external force, the shrinkage causes the formation of air bubbles, arranged into a ring. These cosmetic defects are unacceptable for optical applications.

On the other side, it is not possible to obtain a smooth and even coating surface when coating a Fresnel lens forming surface using traditional spin or dip coating processes. Due to the particular geometry of said structured surface, optical defects, such as optical distortion, result from unevenness of the coating.

Besides, a few processes and methods have been proposed for coating diffractive surfaces on optical articles.

EP 1830205 discloses the preparation of a multilayer diffractive optical element by overmolding. A curable composition is applied between a mold part and a glass base material bearing a cured coating having a surface in a grating shape. Then, the composition is cured and the mold part is released, resulting in an optical article, in which two optical members sandwich a layer constituting a diffraction grating having a grating height of 20 μm.

JP 2007-212547 discloses the coating or lamination of flat diffractive surfaces of lenses, where the liquid composition flow is easily controlled. A layer of curable composition is charged between two lens members, one of which having an internal diffractive surface bearing a diffraction grating. Upon curing, one of the two lens members is moved to compensate for shrinkage of the coating. In the final optical article, the two lens members are stuck to each other through the cured coating composition.

However, no pressure is applied on the lens/optical members or the mold part during curing and casting of the curable composition in EP 1830205 and JP 2007-212547. As a consequence, coating shrinkage does not cause formation of bubbles. However, it will be very hard to control the coating resin thickness precisely in the entire lens surface, especially when the structure is on a curved surface, which is required to make a high optical quality lens.

SUMMARY OF THE INVENTION

The present invention has been made in view of the foregoing problems, and it is an object of the present invention to provide a process for applying a coating on Fresnel type surfaces.

Another object of the invention is to provide a process for transferring a stack of coatings from a carrier to the Fresnel type surface of an optical article.

Yet another object of the invention is to provide a process which delivers optical articles that do not exhibit cosmetic defects, i.e. which present a smooth and evenly coated surface. The process should avoid creating any air bubble during curing of the curable composition from which said coating is formed.

The present inventors have found that these problems can be solved by specific process conditions, in particular by controlling the pressure applied on the carrier when spreading the coating liquid, and the carrier characteristics, in particular its base curvature and thickness.

To achieve the foregoing objects, and in accordance with the invention as embodied and broadly described herein, the present invention relates to a process for coating at least one geometrically defined surface of the substrate of an optical article, said surface forming a Fresnel lens, comprising:

(a) providing a removable carrier made of a plastic material and having an internal surface and an external surface, said internal surface optionally bearing a stack of one or more coatings having an exposed surface;

(b) providing an optical article comprising a substrate having at least one geometrically defined surface forming a Fresnel lens, the base curvature of the substrate and the base curvature of the carrier being substantially the same;

(c) depositing a curable coating composition onto either the at least one surface forming a Fresnel lens, the internal surface of the carrier, or the exposed surface of the coating stack borne by the carrier;

(d) moving the carrier and the optical article relatively to each other to bring the deposited curable coating composition into contact with either the at least one surface forming a Fresnel lens, the internal surface of the carrier or the exposed surface of the coating stack borne by the carrier;

(e) applying a pressure higher than or equal to 0.138 Bar onto the external surface of the carrier to spread out the curable coating composition so as to cover said at least one surface forming a Fresnel lens, with the proviso that the ratio Rtb defined as: thickness of the carrier (in millimeters)/applied pressure (in Bar) is higher than or equal to 1.85;

(f) curing the layer of curable coating composition;

(g) withdrawing the removable carrier to recover the substrate of the optical article having at least one Fresnel lens forming surface coated with the cured coating composition and optionally with the transferred coating stack.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein.

DETAILED DESCRIPTION OF THE INVENTION AND PREFERRED EMBODIMENTS

Figure 1A:
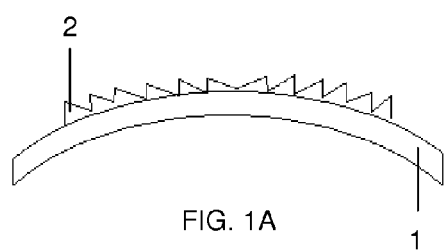
FIGS. 1A to 1E are schematic views of the main steps of a first embodiment of the coating process of the invention, wherein the Fresnel lens forming surface lies on the convex surface of the optical article's substrate.
Figure 2A:
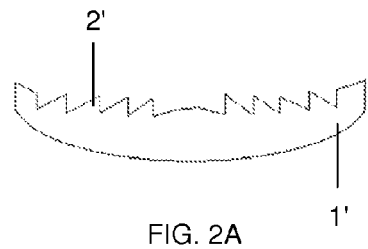
FIGS. 2A to 2E are schematic views of the main steps of a second embodiment of the coating process of the invention, wherein the Fresnel lens forming surface lies on the concave surface of the optical article's substrate.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When the optical article or carrier comprises one or more surface coatings, the term "to deposit a layer onto the optical article or carrier" means that a layer is deposited onto the exposed surface of the outermost coating of the optical article or carrier.

By outermost (or outer) and innermost coatings of a coating stack borne by a carrier, it is meant the coatings of the coating stack which are respectively the furthest from and the closest to the carrier.

A coating that is "on" a carrier or has been deposited "onto" a carrier is defined as a coating that: (i) is positioned over the carrier, (ii) need not be in contact with the carrier, i.e., one or more intervening coatings may be disposed between the carrier and the coating in question, and (iii) need not cover the carrier completely, but preferably covers it completely.

According to the invention, the optical article to be coated with the present process comprises a substrate, in mineral or organic glass, that typically has rear and front main faces.

The optical article of the present invention preferably is a transparent optical article, more preferably a lens or lens blank, and even more preferably an ophthalmic lens or lens blank, which may be finished or semi-finished.

A finished lens is defined as a lens obtained in its definitive shape, having both of its main faces surfaced or cast to the required geometry. It is generally produced by pouring polymerizable compositions between two molds exhibiting required surface geometries and then polymerizing.

A semi-finished lens is defined as a lens having only one of its main faces (generally the front face of the lens) surfaced or cast to the required geometry. The remaining face, preferably the rear face of the lens, has then to be surface-finished to the desired shape.

In the case of a lens, the rear (back) surface (generally the concave face) of the substrate is the surface of the lens substrate which, in use, is the closest to the wearer's eye. The front surface (generally the convex surface) of the lens substrate is the surface of the lens substrate which, in use, is the farthest from the wearer's eye.

The substrate may be made of mineral glass or organic glass, preferably organic glass (polymer substrate). The organic glasses can be made of any material currently used for organic ophthalmic lenses, e.g., thermoplastic materials such as polycarbonates and thermoplastic polyurethanes or thermosetting (cross-linked) materials such as those obtained by polymerization of allyl derivatives such as the allyl carbonates of linear or branched aliphatic or aromatic polyols, such as ethylene glycol bis(allyl carbonate), diethylene glycol bis(2-methyl carbonate), diethylene glycol bis(allyl carbonate), ethylene glycol bis(2-chloroallyl carbonate), triethylene glycol bis(allyl carbonate), 1,3-propanediol bis(allyl carbonate), propylene glycol bis(2-ethylallyl carbonate), 1,3-butenediol bis(allyl carbonate), 1,4-butenediol bis(2-bromoallyl carbonate), dipropylene glycol bis(allyl carbonate), trimethylene glycol bis(2-ethylallyl carbonate), pentamethylene glycol bis(allyl carbonate), isopropylene bisphenol-A bis(allyl carbonate), poly(meth)acrylates and copolymers based substrates, such as substrates obtained by the polymerization of alkyl methacrylates, in particular $C_1$-$C_4$ alkyl methacrylates such as methyl(meth)acrylate and ethyl(meth)acrylate, substrates comprising (meth)acrylic polymers and copolymers derived from bisphenol-A, polyethoxylated aromatic (meth)acrylates such as the polyethoxylated bisphenolate di(meth)acrylates, polythio(meth)acrylates, thermosetting polyurethanes, polythiourethanes, polyepoxides, polyepisulfides, as well as copolymers thereof and blends thereof.

Substrates particularly recommended are polycarbonates, for example those made from bisphenol-A polycarbonate, sold for example under the trade names LEXAN® by General Electric or MAKROLON® by Bayer AG, or those incorporating carbonate functional groups, in particular substrates obtained by polymerization or copolymerization of diethylene glycol bis(allyl carbonate), sold under the trade name CR-39® by PPG INDUSTRIES (ORMA® ESSILOR lens).

Among other recommended substrates are substrates obtained by polymerization of thio(meth)acrylic monomers, such as those disclosed in the French patent application FR 2734827.

The substrates may obviously be obtained by polymerizing mixtures of the above monomers. By "(co)polymer", it is meant a copolymer or polymer. By "(meth)acrylate", it is meant an acrylate or methacrylate.

The substrate of the optical article has at least one geometrically defined surface forming a Fresnel lens. It will be usually referred to as "the Fresnel type surface" or the "Fresnel lens forming surface" within the present disclosure. Said geometrically defined surface may be a flat, concave or convex surface.

By "Fresnel lens" or "echelon lens", it is meant a lens based on the Fresnel focusing mechanism, which incorporates the space-saving and/or weight-saving design principle seen in a conventional Fresnel lens. Consequently, the term "Fresnel lens" encompasses modified Fresnel lenses or modified echelon lenses, such as those disclosed, for example, in EP 0342895.

Fresnel lens forming surfaces are well known and are mainly used to modify the power of an optical component. See, for example, U.S. Pat. No. 3,904,281 and WO 2007/141440.

Generally, a Fresnel lens forming surface is an intentionally created structure comprising a set of concentric annular lens sections known as Fresnel zones, which are oriented and centered according to an optical axis noted z. The axis z intersects the optical center of the geometrically defined surface forming a Fresnel lens. The surface comprises a concentric, coaxial series of discrete lens sections thereby forming a thinner lens with a short focal length and large diameter, compared to the corresponding single lens with a continuous surface.

Preferably, gaps Δz between two successive Fresnel zones have a size higher than 2 μm, more preferably higher than 3 μm, even better higher than 4 μm. The Fresnel lens forming surface used in this preferred embodiment exhibits a pure refractive optical effect. By "gap between two successive Fresnel zones", it is meant the height difference between the bottom (valley) of a Fresnel zone and the top (peak) of the adjacent Fresnel zone, in other words the peak-to-valley height.

As used herein, gaps are measured according to the direction of a z axis perpendicular to the tangent to the smooth underlying surface (i.e. perpendicular to the surface of the substrate) in the optical center of the geometrically defined surface forming a Fresnel lens.

Figure 4:
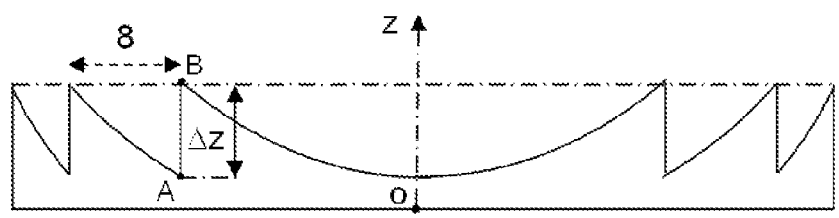
FIG. 4 is a schematic sectional view of a portion of a Fresnel type coating that may be used in the present invention.

FIG. 4 is a non limiting schematic sectional view of a portion of a Fresnel type coating which may be used in the present invention, showing a Fresnel zone 8 exhibiting a gap Δz with the adjacent Fresnel zone on the right. The size of the gap Δz is measured from the valley A of the Fresnel zone 8 to the peak B of the adjacent Fresnel zone. The z axis intersects the optical center O of the Fresnel type coating. Gaps Δz are parallel to the z axis and each Fresnel zone corresponds to a lens section, wherein thickness of the Fresnel type coating varies continuously within said zone.

The sizes of the gaps between two successive Fresnel zones may be constant or variable over the whole geometrically defined surface or at least a portion thereof. The gaps between two successive Fresnel zones have a size generally ranging from 2, 3, 4 or 5 μm to 250 μm, preferably from 2, 3 or 4 μm to 200 μm, even better from 5 to 150 μm, which creates a rough surface structure.

Generally, the preferred Fresnel type coatings used are such that $\Delta z \times \Delta n \geq 10\lambda$ with $\lambda$=one wavelength of the visible spectrum, typically $\lambda$=500 nm. Δn is the difference of refractive index between the material of the Fresnel lens and the material adjacent to the Fresnel lens (in practice the coating). This allows avoiding interferences between the zones.

Preferably, surface roughness $R_q$ of the uncoated Fresnel lens forming surface of step (b) is higher than or equal to 2 μm, more preferably ≧5 μm, even better ≧10 μm. It is preferably lower than or equal to 250 μm, more preferably ≦200 μm, even better higher ≦150 μm. The root mean square (RMS) roughness ($R_q$) is a conventional parameter well known to those skilled in the art. It corresponds to the root mean square average of the roughness profile ordinates (RMS deviation of the profile from the mean line over one sampling length, measured in two dimensions) and has been defined in US 2005/140033, which is hereby incorporated by reference.

$R_q$ can be measured with a contact type or a light wave interference type surface roughness measuring device (see e.g. the method disclosed in US 2005/140033), or an atomic force microscope (AFM).

The spacing between two successive Fresnel zones, i.e. the grating pitch, may be constant or variable over the whole geometrically defined surface or at least a portion thereof. This spacing generally ranges from 10 μm to 2 mm, preferably from 20 μm to 200 μm.

A first preferred Fresnel type structure is described in WO 2007/141440. Said structure exhibits gaps between two successive Fresnel zones having a substantially identical size within a circular area having typically a diameter of 20 mm centered on the optical center of the geometrically defined surface. Gaps preferably range from 5 to 50 μm within this circular area, and gaps at the periphery of the geometrically defined surface (i.e. outside said circular area) are variable in size and preferably range from 5 to 250 μm.

A second preferred Fresnel type structure is described in WO 2007/141440. Said structure exhibits gaps between two successive Fresnel zones having a substantially identical size over the whole geometrically defined surface forming a Fresnel lens. Said size preferably ranges from 5 to 100 μm.

Obviously, the structure of the Fresnel lens forming surface depends on its application and may be easily calculated by those skilled in the art to achieve the desired optical characteristics. The optical power of the final optical article will depend on the gap between two successive Fresnel zones and the grating pitch of said structure.

The material forming the Fresnel lens may be any material and may be or not the same as the material of the substrate of the optical article. For example, the material forming the Fresnel lens can be a thermoplastic or thermoset polymer, such as bis(allyl carbonate) of glycols, polycarbonates, poly (methyl methacrylate), polyurethanes, polythiourethanes, epoxy materials and polymers obtained from episulfides and (thio)urethanes.

The Fresnel type surface of the substrate may be obtained, without limitation, by molding, by depositing onto the substrate a coating having an exposed surface forming a Fresnel lens (i.e. a "Fresnel type coating" at least partially coating the substrate), by in mold coating or by overmolding a substrate. Such techniques are well known to those of ordinary skill in the art.

In a preferred embodiment, the substrate is coated with a Fresnel type coating. Said coating may be directly deposited or glued onto the naked substrate of the optical article, or onto one or more functional coatings borne by the substrate, for example an impact-resistant coating (primer coating), an abrasion- and/or scratch-resistant coating (hard coat), a polarized coating, a photochromic coating, or a dyeing coating. Fresnel type coatings or "patches" and their preparation are disclosed in WO 2007/141440, which is hereby incorporated by reference.

The Fresnel lens forming surface which is coated using the process according to the present invention may cover the whole substrate surface or only a portion of said substrate. It is preferably located at the center of the substrate, e.g. centered on the optical axis of the substrate, but may also be put out of the optical axis of the substrate.

In the case of a lens, the Fresnel lens forming surface to be coated preferably lies on the front (convex) main surface of the substrate, but it can also lie on the rear (concave) surface of the substrate, or both. Using the present process, Fresnel type surfaces may be coated successively or simultaneously on both front and rear geometrically defined surfaces of the optical article.

Optionally, but not preferably, it is possible to perform a physical or chemical adhesion promoting pretreatment on the Fresnel lens surface before coating.

The carrier which is used in the present process is a rigid or flexible carrier, preferably a flexible carrier. The carrier may be a mold part. An important requirement is that its base curvature be substantially the same as the base curvature of the substrate for reasons which will be detailed later. As a consequence, the carrier cannot have a base curvature substantially different from the substrate, even though the carrier is a flexible carrier having a geometry conformable to the general shape of the optical surface of the substrate.

The difference of base curvature between the rigid or flexible carrier and the base curvature of the substrate preferably ranges from −0.3 to 0.3, more preferably from −0.2 to 0.2, better from −0.1 to 0.1, the best being 0.

Preferably, the base curvatures are the same, i.e. the surface of the carrier which is intended to be pressurized against the substrate inversely replicates the geometry of the surface of the optical article bearing the Fresnel type surface.

By "internal surface of the carrier", it is meant the main surface of the carrier that will be directed toward the main surface of the optical article bearing the Fresnel lens forming surface during the present process. The internal surface of the carrier may be a concave or convex surface, depending on the shape of the substrate having the Fresnel type surface thereon.

By "base curvature of the carrier", it is meant the base curvature of the internal surface of said carrier. The base curvature is conventionally defined as being equal to 530/R (R in mm being the radius of curvature).

Generally, the substrate of the optical article has a spherical shape. In this case, the carrier also has a spherical shape and generally two parallel main surfaces, and consequently has an even thickness. When the substrate of the optical article has a cylindrical shape, and therefore two principal meridians defining two base curvatures, the carrier also has a cylindrical (toric) shape with bases curvatures being substantially the same as those of the substrate.

The carrier is a removable carrier, i.e. a carrier that is intended to be removed at the end of the coating process, so that the Fresnel type surface is only coated with the coating obtained from the curable coating composition and optionally the stack of coatings borne by the carrier.

The carriers are thin supporting elements made of a plastic material, thermosetting or thermoplastic, especially a thermoplastic material. Examples of thermoplastic (co)polymers, which can be used for making the carrier are polysulfones, aliphatic poly(meth)acrylates, such as methyl poly(meth) acrylate, polyethylene, polypropylene, polystyrene, SBM (styrene-butadiene-methyl methacrylate) block copolymers, polyphenylene sulfide, arylene polyoxides, polyimides, polyesters, polycarbonates such as bisphenol A polycarbonate, PVC, polyamides such as the nylons, other copolymers thereof, and mixtures thereof. The preferred thermoplastic material is polycarbonate.

Preferably, the carrier is a non elastomer material.

Preferably, the elastic modulus of the carrier material ranges from 1 GPa to 5 GPa, more preferably from 1.5 GPa to 3.5 GPa.

The carrier is preferably light transparent, in particular UV-transparent, thus permitting UV curing of UV curable compositions (light is preferably irradiated from the carrier side). If the curable composition that is employed is thermally cured, then the material of the carrier shall be selected to bear the curing temperature.

Generally, the removable carrier has a thickness of 0.26 to 5 mm, preferably 0.3 to 5 mm, more preferably 0.5 to 3 mm, even better 0.6 to 2.0 mm. However, thickness of the carrier is not free and is linked to the pressure applied during step (e) of the present process in a manner that will be detailed later.

Optionally, the carrier is first coated with a layer of protecting and releasing coating (PRC). Said layer of protecting and releasing coating is not transferred during the present process and stays on the carrier when it is removed during step (g).

Some hydrophobic coatings such as hydrophobic compositions comprising perfluoroether comprising alkoxysilane (e.g. Optool DSX™ from Daikin) can be used as PRC to improve releasing performance from the coating resin.

When the internal surface of the carrier is coated with a non transferable coating, such as a protecting and releasing coating, the exposed surface of said non transferable coating is considered as being the internal surface of the carrier.

The internal surface of the carrier may bear one or more coatings intended to be transferred onto the geometrically defined surface of the substrate. Said coatings may be selected, without limitation, from an anti-reflection coating, an anti-fouling top coat, an anti-abrasion- and/or scratch-resistant coating, an impact-resistant coating, a polarized coating, a photochromic coating, a dyed coating, a printed layer, a microstructured layer, an antistatic coating. Such coatings and preparation of coated carriers are described in WO 2008/015223 and U.S. Pat. No. 6,562,466, which are hereby incorporated by reference. These coatings are applied onto the surface of the carrier in the reverse order with regard to the desired order of the coating stack on the substrate.

In a first preferred embodiment, the coating stack borne by the carrier, when present, comprises the following coatings, starting from the carrier surface: an anti-fouling top coat, an anti-reflection coating, an abrasion- and/or scratch-resistant coating and an impact-resistant primer coating. In a second preferred embodiment, the coating stack borne by the carrier comprises an abrasion- and/or scratch-resistant coating as the sole transferable coating.

When a stack of one or more coatings is transferred, the total thickness of said stack is typically from 1 to 500 μm, but is preferably less than 50 μm, more preferably less than 20 μm, and even better 10 μm or less.

Although the present disclosure is mainly dedicated to obtaining a smooth coated surface, it is worth noting that the present invention also encompasses the case where the working surface of the carrier (its internal surface) has a relief organized according to a pattern, in other words, a microstructured surface, which confers to the final optical article an optical surface having the properties imparted by the microstructure (for example antireflective properties). In this case, the exposed surface of the optical article resulting from step (g) of the present process is not smooth. Different techniques for obtaining microstructured mold parts are disclosed in WO 99/29494.

The microstructured surface of the carrier may be the surface contacting the curable coating composition, i.e. the internal surface of the carrier itself or the exposed surface of its outer coating. In this case, the microstructure will be duplicated in the cured coating during the coating process. The microstructured surface of the carrier may also be its surface contacting the innermost coating that it bears that will be transferred during the coating process.

The curable coating composition is either deposited on the internal surface of the carrier, the exposed surface of the coating stack borne by the carrier (on the condition that such coating stack is present), or the at least one surface forming a Fresnel lens, preferably on the at least one surface forming a Fresnel lens.

By "exposed surface of the coating stack borne by the carrier", it is meant the exposed surface of the outermost coating of said carrier.

Said curable coating composition for use in the present coating process is a liquid composition, which may be thermally-curable (heat-curable) or cured through light irradiation (light-curable or radiation-curable), in particular UV irradiation, or both heat- and light-curable.

Curing is performed according to known methods. For example, heat-curing may be carried out by placing the assembly formed by the substrate, the curable coating composition and the carrier in or close to a heating device, such as a hot water bath, an oven, an IR heat source or a microwave source. Heat-curing is typically performed at a temperature ranging from 40 to 130° C., preferably from 60 to 120° C., more preferably from 70 to 110° C.

The curable coating composition should not impair the optical properties of the final optical article and may be any classical liquid curable coating composition, in particular a composition used for forming functional coating layers for improving the optical and/or mechanical properties of an optical article such as an ophthalmic lens. For example, a primer coating composition for improving adhesion and/or impact resistance, an abrasion and/or scratch resistant coating composition, as well as other coatings compositions such as a polarized coating composition and a photochromic or dyeing coating composition can serve as a curable coating composition. In a preferred embodiment, the curable coating composition is an abrasion and/or scratch resistant coating composition.

The curable coating composition has adhesive properties with the Fresnel lens surface, so that it will achieve, after curing, adhesion with the Fresnel lens forming surface.

The curable coating composition may be deposited by any of the techniques known in the art. It is preferably dispensed as at least one drop at the center of the geometrically defined surface of the substrate or of the carrier.

An important requirement is that, in the course of the pressure application step (e), the curable composition be regularly spread out on the entire geometrically defined surface of the optical article forming a Fresnel lens without excess pressure, so that, after the curing step, there is formed a smooth coating layer or an adhesion interlayer covering the entire geometrically defined surface of the optical article. Over pressure will cause bubble due to resin shrinkage and Rtb ratio change. The deposited amount of said composition must be sufficient so as not to leave any unfilled area after pressing step (e), i.e. to at least fill up the grooves of the rough Fresnel structure and form a final uniform assembly.

Concomitantly, the amount of said composition shall be kept as low as possible to prevent large overflowing of the composition at the periphery of the optical article for avoiding an additional cleaning step to eliminate the excess of said composition.

In one embodiment of the invention, in addition to its adhesive properties with the Fresnel lens surface, the curable composition is an adhesive curable coating composition or curable glue composition that has adhesive properties with coatings borne by the carrier when the carrier bears such coatings.

This embodiment is particularly interesting when the carrier bears coatings to be transferred. Indeed, curing of the adhesive composition results in a safe bonding of the transferred coating stack which was borne by the carrier to the geometrically defined surface of the substrate through the layer of cured adhesive composition.

The liquid curable glue or adhesive composition may comprise, without limitation, polyurethane compounds, epoxy compounds and/or (meth)acrylate compounds.

Preferred components of the liquid curable adhesive composition are acrylate compounds such as polyethylene glycol di(meth)acrylates, polyurethane(meth)acrylates, ethoxylated bisphenol A di(meth)acrylates, various trifunctional acrylates such as ethoxylated trimethylolpropane triacrylate and tris(2-hydroxyethyl)isocyanurate. Monofunctional acrylates such as isobornyl acrylate, 2-hydroxyethyl methacrylate benzyl acrylate, phenylthioethyl acrylate are also suitable. The above compounds can be used alone or in combination. Suitable glues are commercially available from Ultra Optics Co. or Henkel under the trade name Loctite®.

In one embodiment, the refractive index of the cured coating composition is different from the refractive index of the material forming the Fresnel structure. The larger the refractive index difference, the better the optical power will be. In this embodiment, the minimum difference of refractive index is >0.03.

The curable composition can comprise additives such as optical dyes or photochromic dyes.

In a best embodiment, in order to obtain a final optical article free of cosmetic defects and having a smooth surface, it is recommended that the carrier and the optical article be moved toward each other very carefully to spread the curable coating composition on the surface forming a Fresnel lens so as it be covered without leaving any unfilled area and without creating bubbles. The carrier is preferably applied against the Fresnel type surface at its center and very slowly and lightly, which allows the liquid coating composition to flow at a very slow speed, preferably at a speed of less than 10 mm/s, more preferably at a speed of less than 6 mm/s, even better at less than 5 mm/s, typically at around 3 mm/s.

The present inventors have found that the level of bubble formation upon curing was related to the carrier features, namely its base curvature and thickness, as well as the applied pressure.

Accordingly, the pressure applied onto the external surface of the carrier (i.e. the surface of the carrier which is not in contact with the curable composition and/or transferable coatings) has to be carefully controlled.

Firstly, the applied pressure must be higher than or equal to 0.138 Bar (2 Psi), preferably higher than or equal to 0.207 Bar (3 Psi), and more preferably higher than or equal to 0.345 Bar (5 Psi). According to the invention, the assembly of the Fresnel structure filled with the curable coating composition thus forms at the end of step (e) a layer having an even thickness. By "even thickness", it is meant that the variation of thickness over the entire layer area has no consequence on the optical power of the final optical article.

On the contrary, when the applied pressure is too low or nil, the spreading of the curable composition cannot be achieved over the entire geometrically defined surface and cannot be well controlled, resulting in an uneven final coating.

It has to be understood that an "applied pressure" is a pressure difference between the state where pressure is applied during step (e) and the state where no pressure is applied.

Secondly, the ratio Rtb defined as: thickness of the carrier (in millimeters)/applied pressure (in Bar) must be higher than or equal to 1.85, preferably higher than or equal to 1.92, even better higher than or equal to 2.00. The lower the structure size of the Fresnel lens is ($\Delta z$ and/or grating pitch), the lower the Rtb could be used.

These first and the second requirements both imply that the thickness of the carrier is necessarily higher than or equal to 0.26, preferably higher than 0.30 mm.

For a given applied pressure and Fresnel structure, if the thickness of the carrier is too low, resulting in a Rtb ratio lower than 1.85, the shrinkage of the coating resin in the Fresnel type area will lead to bubble formation in the final optical article after curing. Without wishing to be bound to any particular theory, it is believed that a too thin carrier is more flexible and easily generates isolated and sealed curable composition cells when external pressure is applied. The stronger the sealing of the coating composition in the cells, the bigger the bubble phenomenon will occur due to the coating shrinkage in the cell.

Also, for a given carrier thickness, if the pressure applied during step (e) is too high, resulting in a Rtb ratio lower than 1.85, the same bubble formation phenomenon is observed, whereas no bubble formation would occur if the surface to be coated were smooth or little rough. Although not wishing to be bound by any theory, it is believed that a too high pressure is prone to cause so sufficient deformation of the carrier as to generate isolated curable composition cells, which do not communicate with each other.

In addition, an excessive pressure may impart any deformation to the substrate.

The present inventors have also found that shrinkage of the coating in the Fresnel type area was affected by the respective curves of the carrier and the substrate, which have to be substantially the same to avoid bubble formation.

By "base curvature of the substrate", it is meant the base curvature of the surface of the substrate bearing the geometrically defined surface forming a Fresnel lens.

When the three requirements of the present process are simultaneously satisfied, namely a Rtb ratio $\geq 1.85$, an applied pressure higher than or equal to 0.138 Bar and a base curvature of the substrate being substantially the same as the base curvature of the carrier, the optical article obtained at step (g) of the present process exhibits an evenly coated Fresnel lens forming surface, with no bubble formation induced by the unavoidable coating shrinkage phenomenon.

In the final optical article, the thickness of the assembly formed by the Fresnel lens forming structure (e.g. the Fresnel type coating) filled and coated with the cured coating composition is preferably less than 300 µm, and more preferably ranges from 10 to 260 nm, even better from 20 to 200 nm.

Typically, roughness $R_q$ of the exposed surface of the coated Fresnel lens forming surface is under 0.05 µm.

The pressure exerted on the external surface of the carrier should be maintained until the curable composition is sufficiently cured so that enough adhesion of the cured coating to the Fresnel lens forming surface is obtained.

The required pressure, in particular air pressure, may be applied using an inflatable membrane, which can be made of any elastomer material sufficiently deformable by pressurization with appropriate fluid for urging the carrier against the optical article. For example, an inflatable membrane apparatus placed on the external surface of the carrier as disclosed in WO 03/004255 may be used.

Preferably, the pressure is first applied on the center part of the carrier and in a second step the pressure is radially increased towards the periphery of the substrate.

The applied pressure will depend on the sizes and curvatures of the substrate and carrier. It will typically range from 0.138 to 1.38 Bar (2 to 20 Psi), preferably from 0.345 to 1.03 Bar (5 to 15 Psi).

Whilst the invention has been described with the pressure applied by an inflatable membrane placed on the carrier, which is the preferred embodiment, it is to be understood that the inflatable membrane could be placed on the external surface of the lens bearing the Fresnel surface, the external face of the carrier being supported by a supporting element. The pressure applied on the external surface of the lens will also be applied, by reaction, on the carrier which is urged against the supporting element.

Figure 1B:
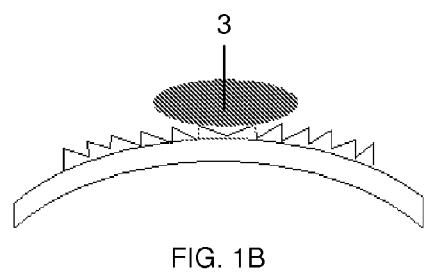
Figure 2B:
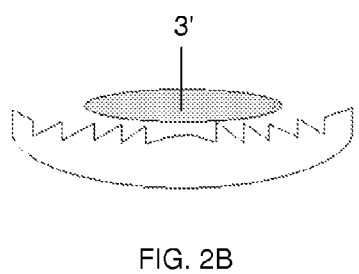
Figure 1C:
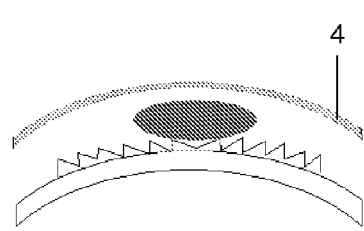
Figure 2C:
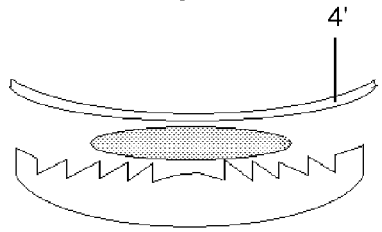
Figure 1D:
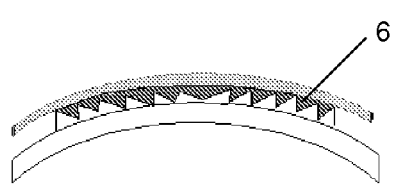
Figure 2D:
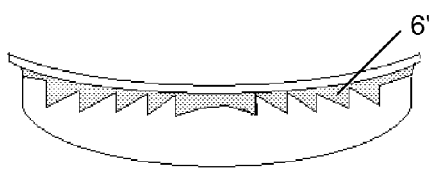

Referring now to the drawings, which only illustrate certain embodiments of the invention, and in particular to FIGS. 1A to 1E, a substrate 1 having a geometrically defined surface forming a Fresnel lens 2 on its convex surface is placed on a supporting element (not represented) with its convex surface facing upwardly (FIG. 1A). Liquid drops of a curable coating composition 3 are applied on the Fresnel lens forming surface (FIG. 1B). A carrier 4 having the same base curvature as the carrier is then placed onto a supporting element (not represented) with its internal surface facing downwardly (FIG. 1C).

Due to the geometry of the Fresnel structure, the liquid drops deposited on the convex side of the substrate are quite stable, so that a concave carrier can be applied directly with a slow approach to avoid creation of any bubbles. the supporting elements are moved relatively to each other to bring into direct contact the curable composition 3 and the internal surface of the carrier 4 (FIG. 1D), thus forming several liquid coating cells 6.

Figure 1E:
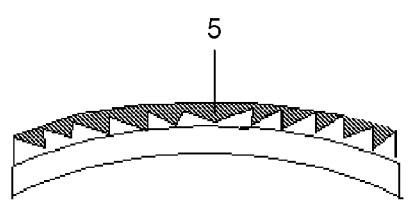
Figure 2E:
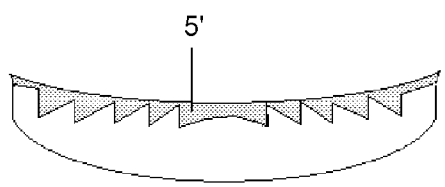

Thereafter, the supporting elements are pressed together in such a manner that the pressure and Rtb ratio requirements of the present invention are fulfilled. The curable composition 3 is then cured using e.g. heat or light, depending on the nature of said composition, the applied pressure is released, the carrier 4 is withdrawn and the substrate 1 having its Fresnel lens forming surface adhering to and coated with the cured coating composition 5 is recovered as shown in FIG. 1E. The obtained optical article exhibits a smooth surface and a suitably protected Fresnel type structure.

FIGS. 2A to 2E represent the main steps of a similar process as disclosed in connection with FIGS. 1A to 1E except that the geometrically defined surface forming a Fresnel lens 2' lies on the concave surface of the substrate 1'.

Figure 3A:
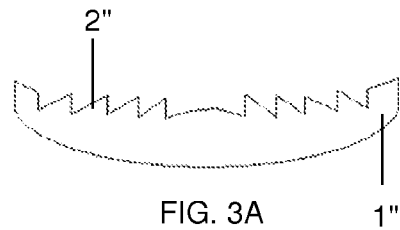
FIGS. 3A to 3E are schematic views of the main steps of a third embodiment of the coating process of the invention, wherein a coating stack borne by the carrier is simultaneously transferred on the substrate during the coating of the geometrically defined surface forming a Fresnel lens.
Figure 3B:
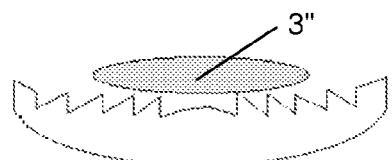
Figure 3C:
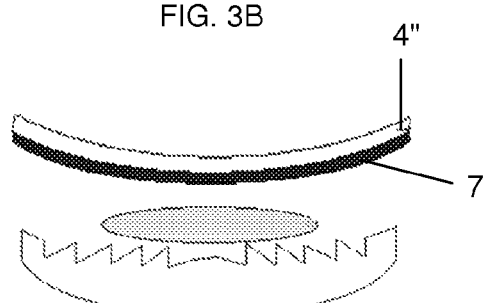
Figure 3D:
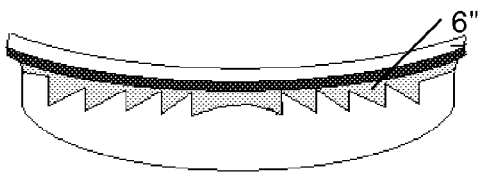
Figure 3E:
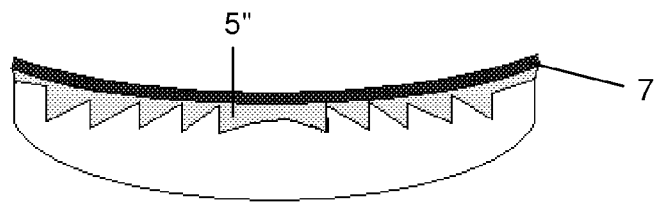

FIGS. 3A to 3E represent the main steps of a similar process as disclosed in connection with FIGS. 2A to 2E except that the carrier 4" bears a stack of coatings 7 on its internal (convex) main surface (FIG. 3C). The supporting elements are moved relatively to each other to bring into direct contact the curable composition 3" and the exposed surface of the coating stack borne by the carrier 4" (FIG. 3D). In this case, coating of the Fresnel lens forming surface involves simultaneously transferring a coating stack onto the substrate. The process delivers a substrate 1" having its Fresnel lens forming surface successively coated with the cured coating composition 5" and the coating stack 7 as shown in FIG. 3E.

The final optical articles obtained by the method of the invention have a very good optical quality and have no or a very low level of interference fringes. They do preferably not absorb light in the visible range (or little), which means herein that when coated on one side according to the inventive process, the optical article has a luminous absorption in the visible range of preferably 1% or less, more preferably less than 1%, and/or a relative light transmission factor in the visible spectrum, Tv, preferably higher than 90%, more preferably higher than 95%, and even more preferably higher than 96%. Preferably, both features are simultaneously satisfied and can be reached by carefully controlling thicknesses of the coatings. As used herein, the Tv factor is such as defined in the standard ISO 8980-3 and corresponds to the 380-780 nm wavelength range.

The present coating process can be applied in the ophthalmic lens industry (preferably), but also in the field of imaging devices, television, lighting instruments, traffic lights and solar cells etc.

The invention is further illustrated by the examples described below. These examples are meant to illustrate the invention and are not to be interpreted as limiting the scope of the invention.

EXAMPLES a) General Considerations

The optical articles coated in the below described experiments were piano lens blanks comprising a polycarbonate substrate (diameter: 70 mm, base curvature: 7.5) and a Fresnel type patch, typically such as disclosed in WO 2007/141440 on their convex surfaces. Said patch has a diameter of 50 mm, a grating pitch ranging from 130 to 260 μm and exhibits gaps between two successive Fresnel zones ranging from 20 to 90 μm. The Fresnel type patch is made of a polycarbonate material having a refractive index of 1.59.

In examples 1 to 3 and C1 to C7, the carrier used was a spherical polycarbonate mold part having a thickness of 0.6, 1.2 or 2.2 mm with 7.5 base curvature (except for examples C2 and C4: 6.5) bearing the protecting and releasing coating described in the examples of WO 2008/015223 on its concave internal surface. This coating is not transferred when implementing the present coating process.

An UV curable adhesive composition having the formulation detailed in Table 1 was employed to coat the Fresnel type surfaces on the convex sides of the lenses. Said composition has a refractive index of 1.52 when cured.

TABLE 1

| COMPONENT | % |
|---|---|
| IBOA (iso-bornyl acrylate) | 12.67 |
| Acrylic acid | 1.70 |
| M600 (Dipentaerythritol hexaacrylate) | 2.87 |
| GE-30 (Trimethylopropane triglycidyl ether) | 8.62 |
| HEMA (2-hydroxyethyl methacrylate) | 25.74 |
| CN994 (polyurethane acrylate) | 43.37 |
| UVI 6976/6992 (photoinitiator) | 2.16 |
| DAR 1173/819 (photoinitiator) | 1.87 |
| IRG 184 (photoinitiator) | 1.00 |
| TOTAL | 100.00 | b) Coating General Procedure 15 drops (about 0.3 g) of the UV curable glue detailed in Table 1 were deposited onto the Fresnel type surface of the lenses (in the center) and then the above described carrier was carefully applied from its concave side on the liquid drops and the Fresnel type convex surface. The carrier was hold until the curable composition was suitably spread to cover the whole Fresnel type area or the majority of the Fresnel area due to the gravity of the carrier. This reduces the risk of liquid bubble trapped in the Fresnel structure if the liquid flow too fast.

Then, a pressure of 0.345 Bar (5 Psi), 0.689 Bar (10 Psi), 1.034 Bar (15 Psi) or 1.378 Bar (20 Psi) was applied onto said carrier (except for examples C3 to C5: no pressure was applied) using a light air balloon to spread out the curable coating composition on the entire Fresnel type surface. No area remained unfilled. While maintaining the applied pressure, the curable coating composition was cured by means of irradiation for 40 seconds with an UV lamp (80 mW/cm$^2$) located on the side of the carrier.

The pressure was released and the carrier was removed, providing a lens having a coated Fresnel type surface. The surface the coated Fresnel lens was a smooth surface, therefore, it can be continually dip or spin hard coated or coated with an antireflective stack when needed.

c) Results

The process parameters and performances of the coated lenses obtained in each example are collected in Table 2.

Comparative example 1 is the same as example 1, except for using a very thin carrier, which lowers the ratio (1)/(2) below 1.85. The obtained final lens had a lot of air bubbles due to surface shrinkage of the coating resin in the Fresnel type area. The same was observed when reducing the thickness of the carrier from example 2 to comparative example 7.

Comparative example 6 is the same as examples 1 and 3, except for using a too high pressure, which lowers the ratio (1)/(2) below 1.85. The obtained final lens had a lot of air bubbles due to surface shrinkage of the coating resin in the Fresnel type area.

Comparative example 2 is the same as example 2, except for using a carrier and a lens having different base curvatures. The obtained final lens had a lot of air bubbles caused by coating shrinkage due to this base curvature mismatch.

Comparative examples 3-5 are the same as examples 1-2, except that no pressure was applied onto the external surface of the carrier during the coating process. No formation of air

TABLE 2

| | Example | | | | | | | | | |
|---|---|---|---|---|---|---|---|---|---|---|
| | 1 | 2 | 3 | C1 | C2 | C3 | C4 | C5 | C6 | C7 |
| Lens base curvature | 7.5 | 7.5 | 7.5 | 7.5 | 7.5 | 7.5 | 7.5 | 7.5 | 7.5 | 7.5 |
| Carrier base curvature | 7.5 | 7.5 | 7.5 | 7.5 | 6.5 | 7.5 | 6.5 | 7.5 | 7.5 | 7.5 |
| Carrier thickness (mm) (1) | 2.2 | 1.2 | 2.2 | 0.6 | 1.2 | 2.2 | 1.2 | 0.6 | 2.2 | 0.6 |
| Applied pressure (Bar) (2) | 0.689 | 0.345 | 1.03 | 0.689 | 0.345 | 0 | 0 | 0 | 1.38 | 0.345 |
| Ratio (1)/(2) | 3.19 | 3.48 | 2.13 | 0.87 | 3.48 | +∞ | +∞ | +∞ | 1.60 | 1.74 |
| Fresnel type surface covered by coating | Good | Good | Good | NG | NG | Good | Good | Good | Good | NG |
| Air bubbles after curing | No | No | No | Yes | Yes | No | No | No | Yes | Yes |
| Coating thickness on the entire surface | Even | Even | Even | Even | Even | Not even | Not even | Not even | Even | Even |
| Cosmetic aspect of the final lens | Good | Good | Good | NG | NG | NG | NG | NG | NG | NG |

NG: not good.

The presence of air bubbles after curing was determined by naked eye in nature light before the carrier was removed. Coating thickness on the entire lens surface was measured by microscopy after the coated lens was cross section cut.

Cosmetic aspect of the final lens was checked by naked eye in nature light after the carrier was removed. When bubbles were present, the structure was not covered by the coating layer, leaving a visual defect in the nature light.

As shown in the above table, the air bubble formation phenomenon is related to the mold part features and the applied pressure.

Due to a choice of the coating process features, namely base curvature of the carrier and lens, applied pressure and thickness of the carrier, no bubble formation induced by coating shrinkage was observed in examples 1 to 3. The final lenses obtained in these examples showed a smooth surface, and an appropriately coated Fresnel lens forming surface. The coated surface did not create any optical distortion when an object was observed throughout. Due to the refractive index difference between the cured coating composition and the material forming the Fresnel structure, the final lenses had a high optical power.

bubbles was observed, but the curable composition spreading could not be well controlled, resulting in an uneven final coating layer.

Example 4

Transfer of HMC (Hard Multicoat) Coating to a Fresnel Lens Surface a) HMC coated carrier was described in the U.S. Pat. No. 6,562,466. A 7.5 base HMC carrier was used for the coating transfer. The HMC carrier had a thickness of 0.6 mm and a diameter of 73 mm.

b) 15 drops (about 0.3 g) of the UV curable glue detailed in Table 1 were deposited in center onto the Fresnel type surface of a lens (7.5 base) (no power: front and back face geometry (except the Fresnel structure) were the same). The Fresnel structure is in the concave side of the lens whose Fresnel structure and had a constant height (gaps Δz) of 28 micrometers between two successive Fresnel zones, but different width (grating pitches) from center to periphery (from 100 nm to 211 nm). Then the above described HMC carrier was carefully applied from its convex side which bore a reversed HMC coating on the liquid drops and the concave Fresnel surface. The carrier was hold until the curable composition was suitably spread to cover the majority of the Fresnel area due to the gravity of the carrier. Then, a pressure of 0.138 Bar (2 Psi) was applied onto said carrier using a light air balloon to spread out the curable coating composition on the entire concave Fresnel surface. No area remained unfilled. The Rtb ratio was kept at a value of 4.35.

c) While maintaining the applied pressure, the curable coating composition was cured by means of irradiation for 40 seconds with an UV lamp (80 mW/cm$^2$) located on the side of the carrier. After curing, the carrier was removed with the HMC layer transferred to a Fresnel structured lens. The HMC coating layer on this Fresnel structured lens was very smooth without any bubble. There was no optical distortion seen on this coated Fresnel lens. The obtained Fresnel lens had very good optical and mechanic performance, such as hardness, anti-reflection, adhesion.

The invention claimed is:

1. A process for coating at least one geometrically defined surface of an optical article's substrate, said surface forming a Fresnel lens, comprising:
    (a) providing a removable carrier made of a plastic material and having an internal surface and an external surface, said internal surface optionally bearing a stack of one or more coatings having an exposed surface;
    (b) providing an optical article comprising a substrate having at least one geometrically defined surface forming a Fresnel lens, wherein the difference between a base curvature of the substrate and a base curvature of the carrier ranges from −0.3 to 0.3;
    (c) depositing a curable coating composition onto either the at least one surface forming a Fresnel lens, the internal surface of the carrier, or the exposed surface of the coating stack borne by the carrier;
    (d) moving the carrier and the optical article relatively to each other to bring the deposited curable coating composition into contact with either the at least one surface forming a Fresnel lens, the internal surface of the carrier or the exposed surface of the coating stack borne by the carrier;
    (e) applying a pressure higher than or equal to 0.138 Bar onto the external surface of the carrier to spread out the curable coating composition so as to cover said at least one surface forming a Fresnel lens, wherein the ratio of the thickness of the carrier (in millimeters)/pressure applied (in Bar) is higher than or equal to 1.85;
    (f) curing the layer of curable coating composition; and
    (g) withdrawing the removable carrier to recover the substrate of the optical article having at least one Fresnel lens forming surface coated with the cured coating composition and optionally with the transferred coating stack.

2. The process of claim 1, wherein the pressure applied in step (e) is higher than or equal to 0.207 Bar.

3. The process of claim 2, wherein the pressure applied in step (e) is higher than or equal to 0.345 Bar.

4. The process of claim 1, wherein the pressure applied in step (e) ranges from 0.345 to 1.03 Bar.

5. The process of claim 1, wherein the ratio Rtb is higher than or equal to 1.92.

6. The process of claim 5, wherein the ratio Rtb is higher than or equal to 2.00.

7. The process of claim 1, wherein the carrier has a thickness of 0.26 to 5 mm.

8. The process of claim 7, wherein the carrier has a thickness of 0.5 to 3 mm.

9. The process of claim 1, wherein the optical article is an ophthalmic lens comprising a substrate having a convex main surface and a concave main surface.

10. The process of claim 9, wherein the geometrically defined surface forming a Fresnel lens lies on the convex main surface of the substrate.

11. The process of claim 1, wherein the Fresnel lens comprises a set of concentric annular lens sections forming Fresnel zones, and exhibits gaps $\Delta z$ between two successive Fresnel zones having a size higher than 2 μm, said gaps $\Delta z$ being measured according to the direction of a z axis perpendicular to the surface of the substrate at the optical center of the geometrically defined surface forming a Fresnel lens.

12. The process of claim 11, wherein the gaps $\Delta z$ have a size ranging from 5 to 250 μm.

13. The process of claim 12, wherein the gaps $\Delta z$ have a size ranging from 5 to 150 μm.

14. The process of claim 1, wherein the surface roughness $R_q$ of the geometrically defined surface forming a Fresnel lens provided in step (b) is higher than or equal to 2 μm.

15. The process of claim 11, wherein the gaps between two successive Fresnel zones have a substantially identical size ranging from 5 to 50 μm within a circular area having a diameter of 20 mm centered on the optical center of the geometrically defined surface, and wherein the gaps between two successive Fresnel zones have a variable size ranging from 5 to 250 μm outside said circular area.

16. The process of claim 11, wherein the gaps between two successive Fresnel zones have a substantially identical size ranging from 5 to 100 μm over the whole geometrically defined surface forming a Fresnel lens.

17. The process of claim 1, wherein the optical article provided in step (b) comprises a substrate at least partially coated with a coating having an exposed surface forming a Fresnel lens.

18. The process of claim 1, wherein the internal surface of the carrier bears a stack of one or more coatings selected from an anti-fouling top coat, an anti-reflection coating, an anti-abrasion- and/or scratch-resistant coating, an impact-resistant coating, a polarized coating, a photochromic coating, a dyed coating, a printed layer, a microstructured layer and an antistatic coating.

19. The process of claim 1, wherein the curable coating composition comprises an optical dye or photochromic dye.

20. The process of claim 1, wherein the refractive index difference between the material forming the Fresnel lens and the cured coating composition is higher than 0.03.

21. The process of claim 1, wherein the material forming the Fresnel lens is a thermoplastic or thermoset polymer chosen from bis(allyl carbonate) of glycols, polycarbonates, poly(methyl methacrylate), polyurethanes, polythiourethanes, epoxy materials and polymers obtained from episulfides and (thio)urethanes.

22. The process of claim 1, wherein the elastic modulus of the carrier plastic material ranges from 1 GPa to 5 GPa.

23. The process of claim 1, wherein the curable composition is an adhesive curable composition comprising polyurethane compounds, epoxy compounds, or (meth)acrylate compounds.

* * * * *